United States Patent
Burgess (10) Patent No.: US 7,356,394 B2
(45) Date of Patent: Apr. 8, 2008

(54) RFID VEHICLE MANAGEMENT SYSTEM AND METHOD

(75) Inventor: Patrick E. Burgess, Grand Blanc, MI (US)

(73) Assignee: Electronic Data Systems Corporation, Plano, TX (US)

( * ) Notice: Subject to any disclaimer, the term of this patent is extended or adjusted under 35 U.S.C. 154(b) by 112 days.

(21) Appl. No.: 11/033,212

(22) Filed: Jan. 11, 2005

(65) Prior Publication Data

US 2006/0155430 A1  Jul. 13, 2006

(51) Int. Cl.
*G06F 17/00* (2006.01)
(52) U.S. Cl. .............................. 701/33; 701/32; 701/35; 705/28
(58) Field of Classification Search ...................... None
See application file for complete search history.

(56) References Cited

U.S. PATENT DOCUMENTS

| | | | |
|---|---|---|---|
| 6,024,142 A | 2/2000 | Bates | |
| 6,025,784 A | 2/2000 | Mish | |
| 6,085,805 A | 7/2000 | Bates | |
| 6,112,152 A | 8/2000 | Tuttle | |
| 6,121,880 A * | 9/2000 | Scott et al. | 340/572.5 |
| 6,163,278 A * | 12/2000 | Janman | 340/7.2 |
| 6,275,157 B1 | 8/2001 | Mays et al. | |
| 6,484,080 B2 | 11/2002 | Breed | |
| 6,505,780 B1 | 1/2003 | Yassin et al. | |
| 6,522,264 B1 | 2/2003 | Stewart | |
| 6,600,418 B2 | 7/2003 | Francis et al. | |
| 6,739,507 B2 * | 5/2004 | Kudyba | 235/384 |
| 6,794,000 B2 * | 9/2004 | Adams et al. | 428/40.1 |
| 6,820,897 B2 | 11/2004 | Breed et al. | |
| 6,822,582 B2 | 11/2004 | Voeller et al. | |
| 6,898,493 B2 * | 5/2005 | Ehrman et al. | 701/35 |
| 7,098,794 B2 * | 8/2006 | Lindsay et al. | 340/572.3 |
| 7,102,522 B2 * | 9/2006 | Kuhns | 340/572.7 |
| 2002/0003623 A1 * | 1/2002 | Tajima et al. | 356/311 |
| 2002/0082893 A1 * | 6/2002 | Barts et al. | 705/8 |
| 2002/0128769 A1 | 9/2002 | Der Ghazarian et al. | |
| 2002/0163443 A1 | 11/2002 | Stewart et al. | |
| 2003/0020634 A1 | 1/2003 | Banerjee et al. | |
| 2004/0002894 A1 | 1/2004 | Kocher | |
| 2004/0046646 A1 * | 3/2004 | Eskridge | 340/425.5 |
| 2004/0088228 A1 * | 5/2004 | Mercer et al. | 705/28 |
| 2004/0263334 A1 | 12/2004 | Hasegawa et al. | |
| 2005/0065724 A1 | 3/2005 | Lee et al. | |
| 2005/0088320 A1 * | 4/2005 | Kovach | 340/933 |
| 2005/0108115 A1 * | 5/2005 | Green et al. | 705/28 |
| 2005/0143883 A1 * | 6/2005 | Yamagiwa | 701/32 |

* cited by examiner

*Primary Examiner*—Michael J. Zanelli
(74) *Attorney, Agent, or Firm*—Fish & Richardson, PC (57) ABSTRACT

This disclosure describes a Radio Frequency Identification (RFID) vehicle management system and method. For example, an RFID tag may be coupled with a particular vehicle and operable to store identifying information associated with the vehicle and to automatically communicate the identifying information to an RFID tag reader via a wireless communication. In another example, the method may include querying a first RFID tag coupled with a first vehicle for identifying information of the first vehicle. A second RFID tag coupled with a second vehicle for second identifying information of the second vehicle. The first identifying information and the second identifying information is dynamically communicated to a user.

22 Claims, 4 Drawing Sheets

RFID VEHICLE MANAGEMENT SYSTEM AND METHOD

TECHNICAL FIELD

This disclosure relates generally to the field of Radio Frequency Identification (RFID) and, more specifically, to an RFID vehicle management system and method.

BACKGROUND

Vehicles, such as cars, trucks, motorcycles, and others, have various identifying information and characteristics that help identify or categorize them. This information includes make, model, color, manufacturing plant or country of origin, and engine type. This information is commonly represented through a Vehicle Identification number or VIN. For example, in many circumstances, the VIN may allow a dealer, buyer, governmental entity, insurance agencies, or other businesses or entities to uniquely identify the vehicle. In other words, the VIN is typically a series of characters, such as seventeen numbers and letters presenting the information on the vehicle according to ISO 3779, last revised in 1983. The VIN is normally engraved or stamped on a plate that is located near the dashboard or front windshield and must be manually inspected and interpreted.

SUMMARY

This disclosure describes a Radio Frequency Identification (RFID) vehicle management system and method. For example, the disclosure includes an RFID tag that is coupled with a particular Vehicle. The example RFID tag is operable to store identifying information associated with the vehicle and to automatically communicate the identifying information to an RFID tag reader via a wireless communication.

In another example, the method may include querying a first RFID tag coupled with a first vehicle for identifying information of the first vehicle. A second RFID tag coupled with a second vehicle for second identifying information of the second vehicle. The first identifying information and the second identifying information is dynamically communicated to a user.

In yet another embodiment, the RFID vehicle management system may include a first RFID tag coupled with a first vehicle, a second RFID tag coupled with a second vehicle, and a first RFID tag reader. In this embodiment, the RFID tag reader is operable to query the first RFID tag for identifying information of the first vehicle and dynamically communicate the identifying information to a user.

The details of various embodiments of the invention are set forth in the accompanying drawings and the description below. One or more embodiments of the invention may include several important technical advantages. For example, the described techniques may allow a vehicle manufacturer to track vehicles from factory, to storage, to shipping point, to dealership, or any portion of the route therein. Continuing this example, these techniques may enable the dealership to quickly identify vehicles for inventory, marketing, maintenance, repair work, sales, or other purposes. In other words, some or all of the techniques may provide the vehicle dealer (or other entity) with any particular information about a vehicle in substantial real-time using wireless or RFID technology. This information may be filtered, sorted, or otherwise massaged using dynamic or predefined parameters. In yet another example, the tagging of vehicles may deter theft by providing security services and enhanced tracking capabilities. In other examples, the RFID tag may be communicably coupled to portable flash memory, which could enhance storage capabilities, as well as ease of data transfer. Of course, certain embodiments of the invention may have none, some or all of these advantages. Other features, objects, and advantages of the invention will be apparent from the description and drawings, as well as from the claims.

DESCRIPTION OF EXAMPLE EMBODIMENTS

Figure 1:
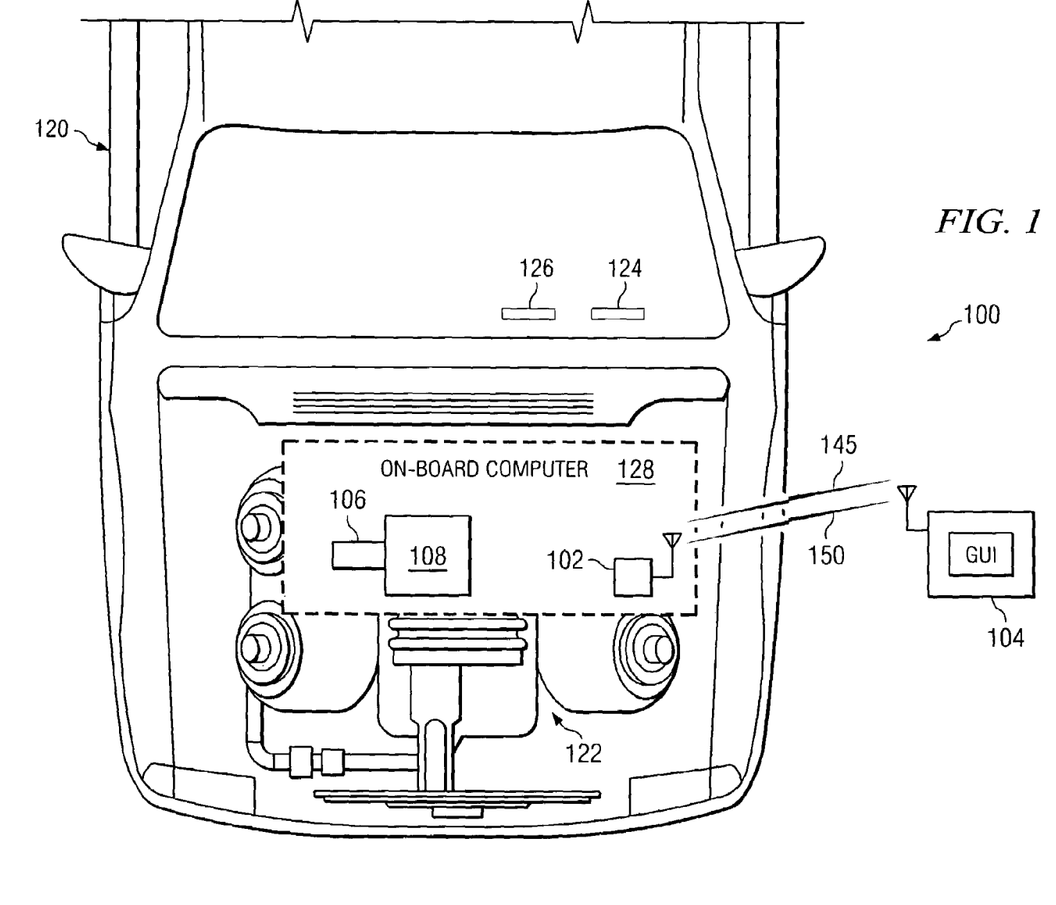
FIG. 1 illustrates an example vehicle, including an RFID tag, and an RFID tag reader in accordance with one embodiment of the present invention.

FIG. 1 illustrates a system 100 for managing at least one vehicle 120 using Radio Frequency Identification (REID). More specifically, any person or entity may use RFID to track, locate, identify, process, filter, or otherwise manage vehicles 120 based, at least in part, on electronic information stored at vehicle 120 and communicated via RFID. For example, a car dealership may retrieve a vehicle identification number (VIN), a make, a model, engine type, a year and/or place of manufacture, or any other information in order to efficiently locate a car (or other vehicle 120) for a potential buyer by comparing this retrieved wireless information to criteria established by the buyer. In this example, the dealership may collect information from a number of cars 120 for presentation to the potential buyer through a website, an on-site terminal, or using any other technique or component. In another example, RFID allows for someone to track vehicle 120 from factory through sale. As used herein, RFID generally encompasses any wireless (or partially wireless) communication that allows for remote retrieval of information from a particular commodity, product, or component. In several embodiments, RFID allows two devices to communicate with one another while not maintaining a line-of-sight in various weather conditions. Returning to FIG. 1, illustrated system 100 includes example vehicle 120, coupled with an RFID tag 102, and the remote RFID tag reader 104 in accordance with one embodiment of the present disclosure.

Vehicle 120 is any device operable to physically travel or move and, often, to transport a person or an item through this movement. For example, vehicle 120 may be an automobile (e.g., a car, a truck, a motorcycle), a golf cart, a robot, a rig, a ship or other water vessel, a jet or other airliner, or any other suitable craft or mobile mechanism. Illustrated vehicle 120 includes engine 122 and on-board computer 128; but, of course, these components are merely exemplary. Typically, vehicle 120 is uniquely identified (at least among a particular field, industry, or business entity) using a VIN 124. VIN 124 is generally a series of characters, such as seventeen numbers and letters, that presents certain identifying information on vehicle 124 and may be compliant with ISO 3779, last revised in 1983. For example, illustrated VIN 124 is engraved or stamped on a plate that is located near the dashboard or front windshield of illustrated vehicle 120. Illustrated vehicle 120 further includes optional control panel or console 126 that is operable to display or customize options such as:

Current settings
Oil life monitor reset
Tire inflation monitor reset
Delayed headlamp illumination
Automatic door lock and unlock
Remote visual/audible verification of remote lock/unlock
Enable/Disable content theft
Enable/Disable trunk lock shock sensor
Short or long horn with remote lock/unlock
Key fob transmitter programming While illustrated as residing in the dashboard of vehicle 120, control panel 126 may be any device operable to identify certain vehicle characteristics and may be anywhere that is communicably coupled with engine 122 or on-board computer 128. For example, control panel 126 may be a Serial Data Link that is based on the SAE J1850 protocol, which is widely used in the U.S. This data link may allow a body control module (or BCM) to receive information and commands for determining its mode of operation. The example BCM may be coupled with, through Class 2 wiring, the instrument panel cluster (IPC), the power train control module (PCM), the data link connector (DLC) and/or the car radio.

Vehicle 120 is coupled with RFID tag 102 using any coupling components or techniques. Generally, RFID tag 102 is any component operable to communicate radio signals or other wireless communications that include identifying information 145 and vehicle characteristics 150. In other words, RFID tag 102 may automatically supply users of system 100 with electronic information about vehicle 120. This information may include static information 145 and changing characteristics 150 and may be dynamically filtered based on certain criteria or parameters. The term "dynamically," as used herein, generally means that certain processing is determined, at least in part, at run-time based on one or more variables. The term "automatically," as used herein, generally means that the appropriate processing is substantially performed by at least part of system 100. It should be understood that "automatically" further includes any suitable user interaction with system 100 without departing from the scope of this disclosure. RFID tag 102 is typically a small component that may be wired, attached, or otherwise secured to vehicle 120. In certain embodiments, RFID tag 102 may be secured in such a way that removing it will disable tag 102, engine 122, or computer 128 or activate some other similar security feature. This optional feature may help ensure that RFID tag 102 is coupled with the appropriate vehicle 120, thereby allowing car dealers or buyers to view RFID information with relative confidence.

RFID tag 102 may be active or passive as appropriate. The active RFID tag 102 is generally a radio transmitter with a power supply and suitable memory (such as one or more megabytes). This tag 102 usually has ranges of dozens of meters and is in an "always on" state (when powered on). Generally, a passive RFID tag 102 is a smaller device, such as 0.4 millimeters, that does not require a power supply and includes less memory. The requisite power is typically provided by the radio signal, which activates the passive RFID tag 102 when information is requested. Whether active or passive, RFID tag 102 is operable to transmit any suitable radio signal. For example, system 100 may be a low frequency system (125-134 kHz), high frequency system (13-14 MHz), a UHF system (850-950 MHz), a microwave system (2.4 GHz), another suitable frequency, or any combination thereof RFID tag 102 may also be communicably coupled with flash memory 106, which provides additional storage capabilities. Flash memory 106 may be any temporary or persistent memory module with any suitable memory capacity. As illustrated, flash memory 106 may be coupled with vehicle 120 using, for example, a Universal Serial Bus (USB) port 108. But, of course, flash memory 106 may be directly coupled with RFID tag 102 or coupled with vehicle 120 at any other appropriate location. In particular embodiments, flash memory 106 is operable to store varying characteristics 150 that may be obtained from various systems in vehicle 120, such as control panel 126. The vehicle characteristics 150 may include, for example, oil level, maintenance records, fuel level, miles, suggested retail or asking price, invoice price, cost of manufacture, ownership data, owner's manual, and other changing data. Flash memory 106 may also be used to supplement the storage capacity of RFID tag 102 for identifying characteristics 102 without departing from the scope of the disclosure.

System 100 uses at least one RFID tag reader 104 for monitoring, querying, or otherwise processing data from RFID tags 102. RFID tag reader 104 is a device, such as an antenna and a transceiver, operable to communicate with RFID tags 102. As described in more detail in FIG. 2, RFID tag reader 104 may also be compatible to communicate, via wireless or wireline signals, with other computers. In certain embodiments, RFID tag reader 104 operates at one frequency compatible with RFID tags 102 or at numerous frequencies to accommodate numerous disparate RFID tags 102, as well as with server 202 (see FIG. 2) for example. Generally, each RFID tag reader 104 may be stationary or mobile as appropriate. For example, RFID tag reader 104 may be a part of or coupled with a golf cart, dealer car, parking post, door or garage, truck stop, shipping point, factory, handheld device, and numerous others. Illustrated RFID tag reader 104 includes an optional GUI, thereby allowing the one or more users to quickly view all of or filtered retrieved information. RFID tag reader 104 may also include an encoder/decoder or other secured communication device.

In one aspect of operation, RFID tag 102 is coupled with vehicle 120 at any suitable time such as, for example, at the time of manufacture. RFID tag 102 may be secured using screws, welding, adhesive, or using other techniques. Before or after being coupled, RFID tag 102 is encoded or otherwise loaded with certain identifying information 145. For example, RFID tag 102 may be programmed with this information using a tag programming station. As described above, this information 145 may include the VIN, which identifies various data describing vehicle 120, or other comparatively static information. When provided with or installed in vehicle 120, flash memory 106 may also be flashed or loaded with known vehicle characteristics 150. Once sufficiently loaded with certain information 145 and/or characteristics 150, then RFID tag 102 is operable to communicate this data to RFID tag reader 104 in response to or based on queries. For example, a user of RFID tag reader 104 may request certain data, such as model, make, color, and asking price, from RFID tag 102. If some of the data is at least partially resident on flash memory 106, then RFID tag 102 retrieves or requests this data and may aggregate it with information stored in RFID tag 102. At one time or over a (relative) time period, RFID tag 102 communicates this data 145 and/or 150 to RFID tag reader 104. Using any appropriate technique, RFID tag reader 104 directly or indirectly presents or otherwise communicates this information to the user or a program module for processing. For example, RFID tag reader 104 may present the information through the resident GUI, create a report after being docked with a computer, or communicate this information to server 202 for subsequent processing and presentment.

Figure 2:
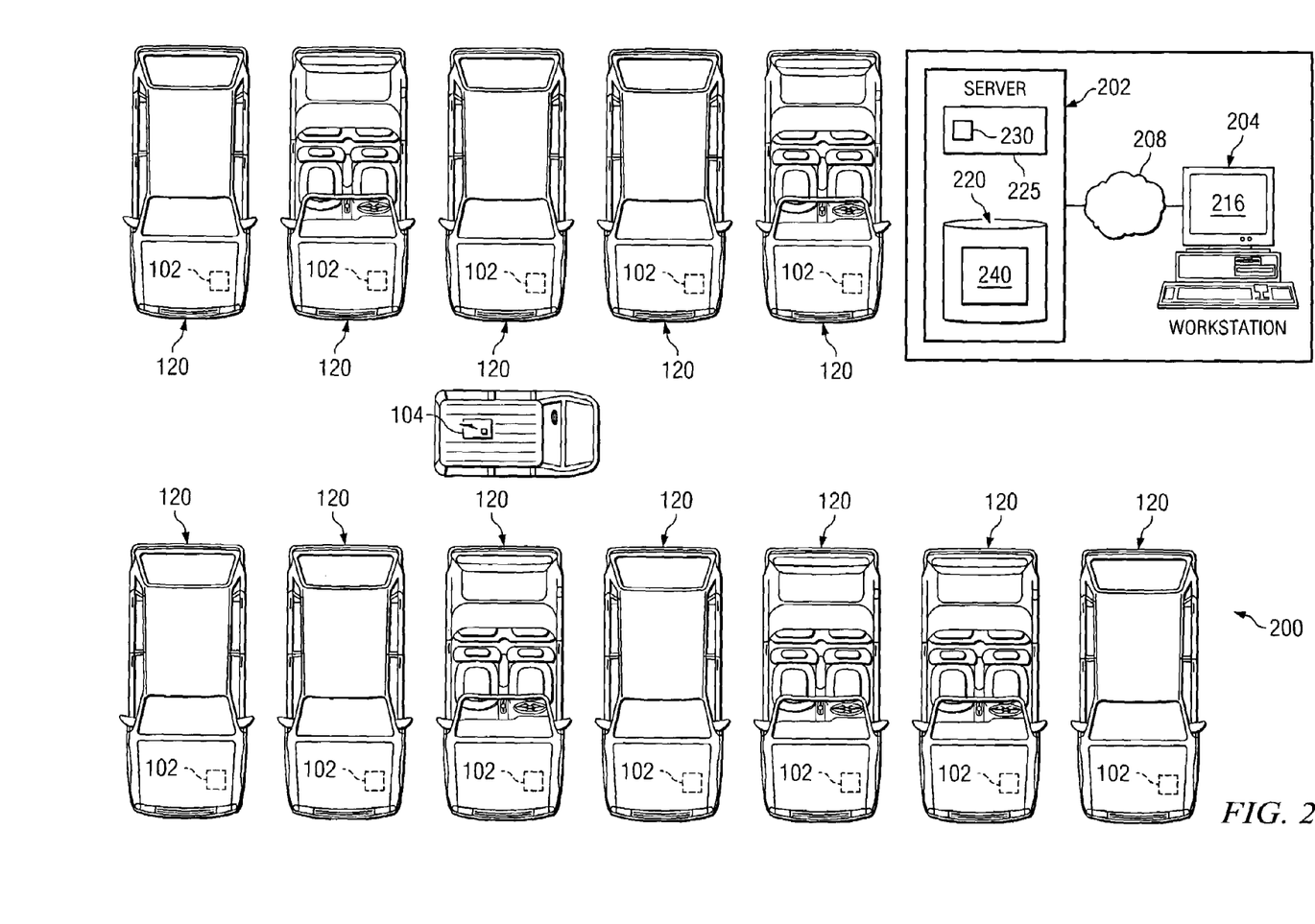
FIG. 2 is an illustration of an example system implementing a plurality of RFID tags.

FIG. 2 is a block diagram illustrating at least a portion of vehicle management system 200 for managing one or more RFID tagged vehicles 120. At a high level, vehicle management system 200 is operable to manage, process, or otherwise track a plurality of vehicles 120 based on information retrieved from each vehicle's RFID tag 102. In other words, system 200 is any networked, wireless, and/or other RFID-compatible environment and may be or include a manufacturing plant, a shipping point, a dealership, and/or other vehicle locations operable to automatically collect and process information from the vehicle RFID tags 102. For example, illustrated system 200 is a dealership comprising a plurality of vehicles 120 (at least one of which includes RFID tag 102), one or more RFID tag readers 104 for dynamically querying RFID tags 102, and a server 202, client 204, and/or other computing device for processing the retrieved information. As described above, system 200 may deploy any number of static or mobile RFID tag readers 104, each operable process RFID tags 102. For example, the dealership may station tag readers 104 at each end of the various lanes of vehicles 120, at the garage, and other strategic points. In another example, the dealership may deploy an RFID tag reader 104 on one or more of the various dealer vehicles (e.g. a golf cart) that is operable move among the vehicles. In yet another example, the dealership may provide each car salesman with a handheld device operable to act as or including RFID tag reader 104.

Server 202 comprises any computer and may be communicably connected with any number of clients 204 and/or other network devices such as switches or routers, printers, docking stations, or others. For example, server 202 may be a blade server, a mainframe, a general-purpose personal computer (PC), a Macintosh, a workstation, a Unix-based computer, a web or email server, or any other suitable device. FIG. 2 only illustrates one example of computers that may be used with the invention. For example, although FIG. 1 illustrates one server 202 that may be used with the invention, system 200 can be implemented using computers other than servers, as well as a server pool. The present invention contemplates computers other than general purpose computers as well as computers without conventional operating systems. As used in this document, the term "computer" is intended to encompass a personal computer, workstation, network computer, or any other suitable processing device. Computer server 202 may be adapted to execute any operating system including Linux, UNIX, Windows, z/OS, or any other suitable operating system so long as server 202 remains operable to process native or massaged RFID data. Server 202 typically includes an interface for communicating with the other computer systems, such as client 204, over network 208 in a client-server or other distributed environment. Generally, the interface comprises logic encoded in software and/or hardware in a suitable combination and operable to communicate with network 208. More specifically, the interface may comprise software supporting one or more communications protocols associated with communications network 208 or hardware operable to communicate physical signals. In short, server 202 may comprise any computer with software and/or hardware in any combination suitable to receive or retrieve RFID information 145 and/or 150 from RFID tags 102 (via RFID tag reader 104), generate web pages or other output based on the vehicular RFID data, and communicate the output to users or one or more clients 204 via network 208.

Network 208 facilitates wireless or wireline communication between computer server 202 and any other computer. Network 208 may communicate, for example, Internet Protocol (IP) packets, Frame Relay frames, Asynchronous Transfer Mode (ATM) cells, voice, video, data, and other suitable information between network addresses. Network 208 may include one or more local area networks (LANs), radio access networks (RANs), metropolitan area networks (MANs), wide area networks (WANs), all or a portion of the global computer network known as the Internet, and/or any other communication system or systems at one or more locations.

Server 202 further includes memory 220 and processor 225. Memory 220 may include any memory or database module and may take the form of volatile or non-volatile memory including, without limitation, magnetic media, optical media, random access memory (RAM), read-only memory (ROM), removable media, or any other suitable local or remote memory component. Illustrated memory 220 includes collected vehicle RFID information 145 and 150 in RFID table 240, but may also include any other suitable data including security logs, web logs, HTML pages and templates, word documents, emails, and others.

Server 202 also includes processor 225. Processor 225 executes instructions and manipulates data to perform the operations of server 202 and may be, for example, a central processing unit (CPU), an application specific integrated circuit (ASIC) or a field-programmable gate array (FPGA). Although FIG. 2 illustrates a single processor 225 in server 202, multiple processors 225 may be used according to particular needs, and reference to processor 225 is meant to include multiple processors 225 where applicable. In certain embodiments, processor 225 executes one or more processes associated with RFID processing engine 230.

RFID processing engine 230 could include any hardware, software, firmware, or combination thereof operable to collect or receive RFID information 145 and 150 from RFID tag readers 104. For example, RFID processing engine 230 may receive RFID information 145, process it according to various algorithms, and store the processed data in RFID table 240. The processing may include mapping the various tagged vehicles 120 using the RFID or Global Positioning System (GPS) technology, embedding information 145 and/or 150 for each tagged vehicle 120, summarizing collected RFID data, and such. RFID processing engine 230 may be written or described in any appropriate computer language including C, C++, Java, J#, Visual Basic, assembler, Perl, any suitable version of 4GL, and others or any combination thereof. It will be understood that while RFID processing engine 230 is illustrated in FIG. 1 as a single multi-tasked module, the features and functionality performed by this engine may be performed by multiple modules. Further, while illustrated as internal to server 202, one or more processes associated with RFID processing engine 230 may be stored, referenced, or executed remotely. Moreover, RFID processing engine 230 may be a child or sub-module of another software module (not illustrated) without departing from the scope of this disclosure. In one embodiment, RFID processing engine 230 may be referenced by or communicably coupled with applications executing on client 204.

Each client 204 is any computing device operable to present the user with raw or processed RFID information via a graphical user interface 216 (GUI). At a high level, illustrated client 204 includes at least GUI 216 and comprises an electronic computing device operable to receive, transmit, process and store any appropriate data associated with system 200. It will be understood that there may be any number of clients 204 communicably coupled to server 202. Further, "client 204," "user," and "dealer" may be used interchangeably without departing from the scope of this disclosure. As used in this document, client 204 is intended to encompass a personal computer, workstation, network computer, kiosk, wireless data port, personal data assistant (PDA), server, one or more processors within these or other devices, or any other suitable processing device. For example, client 204 may comprise a computer that includes an input device, such as a keypad, touch screen, mouse, or other device that can accept information, and an output device that conveys information associated with the operation of server 202 or clients 102, including digital data or visual information, via GUI 216. Both the input device and output device may include fixed or removable storage media such as a magnetic computer disk, CD-ROM, or other suitable media to both receive input from and provide output to users of clients 102 through GUI 216.

GUI 216 comprises a graphical user interface operable to allow the user of client 204 to interface with system 200 to view information associated with one or more vehicles 120. Generally, GUI 216 provides the user of client 204 with an efficient and user-friendly presentation of data provided by system 200, namely information from RFID tags 102. GUI 216 may comprise a plurality of frames or views having interactive fields, pull-down lists, and buttons operated by the user. In one embodiment, GUI 216 communicates one or more web pages presenting information for at least a portion of the queried RFID tags 102. As illustrated in more detail in FIG. 4, GUI 216 may also present summarized or filtered information. Returning to GUI 216, it should be understood that the term graphical user interface may be used in the singular or in the plural to describe one or more graphical user interfaces and each of the displays of a particular graphical user interface. Further, GUI 216 contemplates any graphical user interface, such as a generic web browser, that processes information in system 200 and efficiently presents the information to the user. Server 202 can accept data from client 204 via the web browser (e.g., Microsoft Internet Explorer or Netscape Navigator) and return the appropriate HTML or XML responses using network 208.

Figure 3:
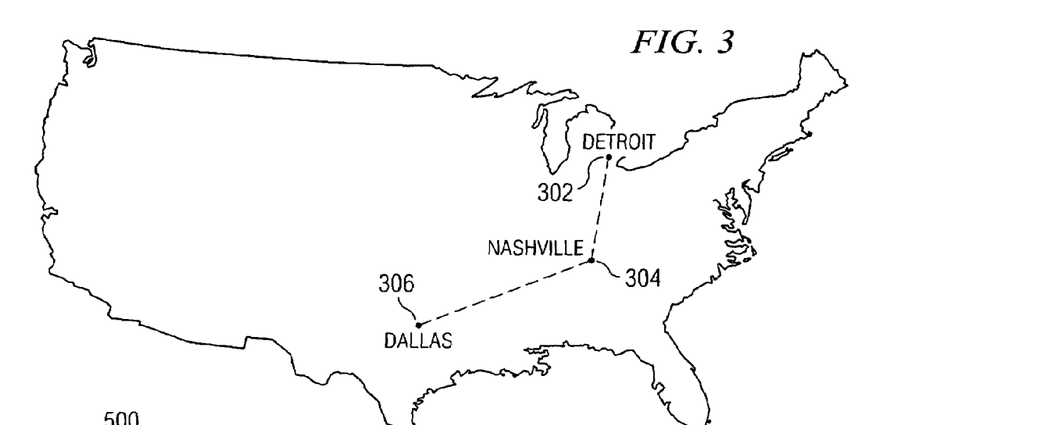
FIG. 3 illustrates an example tracked route of the tagged vehicle of FIG. 1.

FIG. 3 illustrates an example tracking route of a particular vehicle 120 that is coupled with RFID tag 102. Generally, the example route includes three points during the lifecycle of vehicle 120: manufacture plant 302, shipping point 304, and dealership 306. In this embodiment, the tracking route allows a particular manufacture to track vehicle 120 using RFID tag readers 104 stationed at each of these points. This may help allow the manufacturer to ensure the proper destination, as well as the security of vehicle 120. Indeed, the shipping truck 102 may include one RFID tag 102 and each of the loaded vehicles 120 may include an individual RFID tag 102. Of course, the illustrated locations of these points are for example purposes only; moreover, the route from manufacture to sale may include more points, less points, as well as a point with multiple responsibilities or other non-illustrated responsibilities or purposes.

Figure 4:
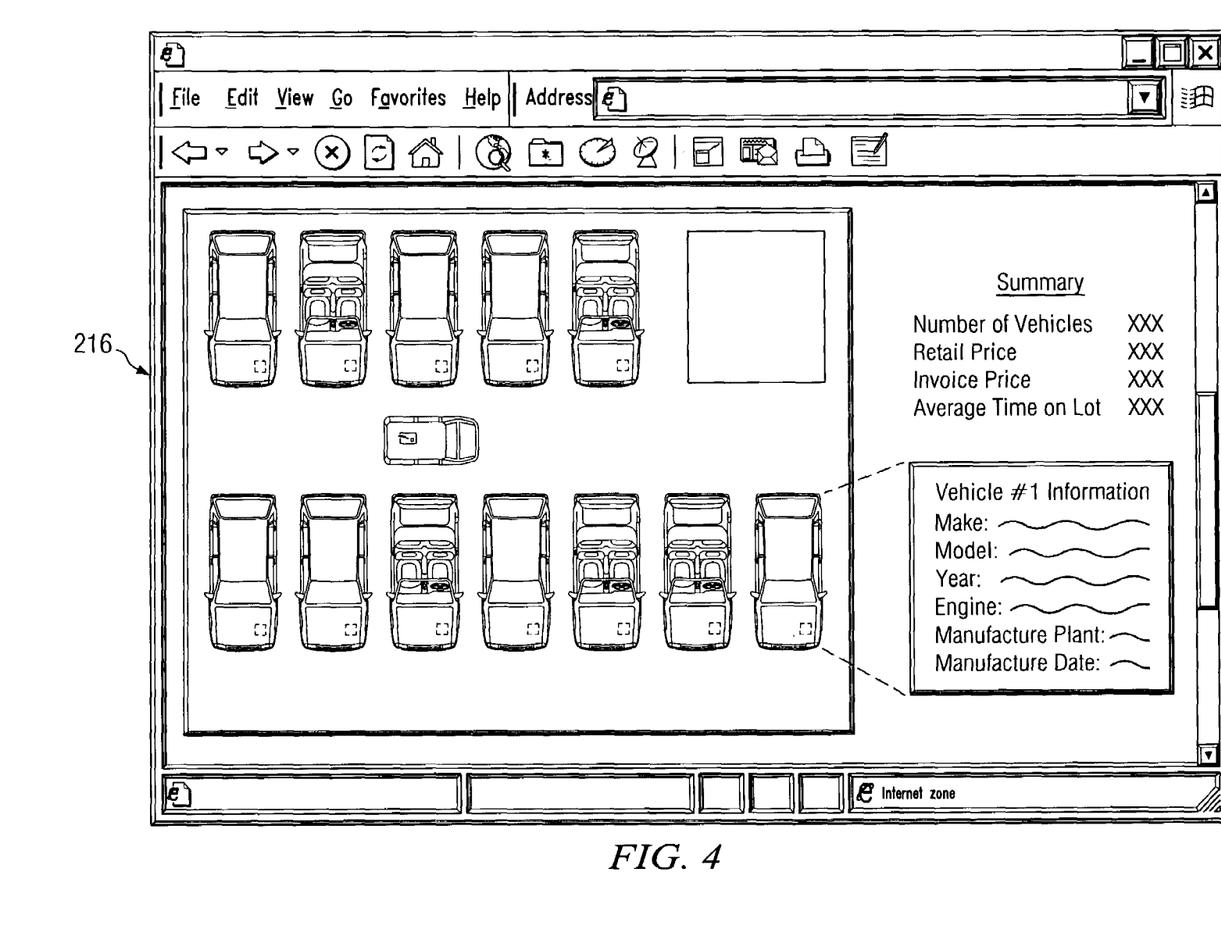
FIG. 4 is a diagram illustrating an example graphical representation in accordance with one embodiment of the system illustrated in FIG. 2.

Returning to the example dealership, FIG. 4 is a diagram illustrating an example webpage presented through GUI 216 for presentation to the user of client 204 in accordance with one embodiment of system 200 shown in FIG. 2. In this example embodiment, illustrated GUI 216 is a graphical representation of dealership 200, including embedded objects representing each tagged vehicle 120, and certain overall or summary data. But GUI 216 may present any information 145 and/or 150 as appropriate. Moreover, GUI 216 may be customized according to user, system 200, or other categories. Server 202 may generate various HTML or other frames for presenting different information. For example, GUI 216 may include a map of vehicles present in system 200 and a summary frame presenting the total number of vehicles, total price of inventory, and other metrics. As the user moves a mouse, for example, over the graphical representation of one of the tagged vehicles 120, GUI 216 presents vehicle data at least partially retrieved via RFID tag readers 104. This data may be embedded in Java, ActiveX, or HTML objects representing each vehicle 120.

Figure 5:
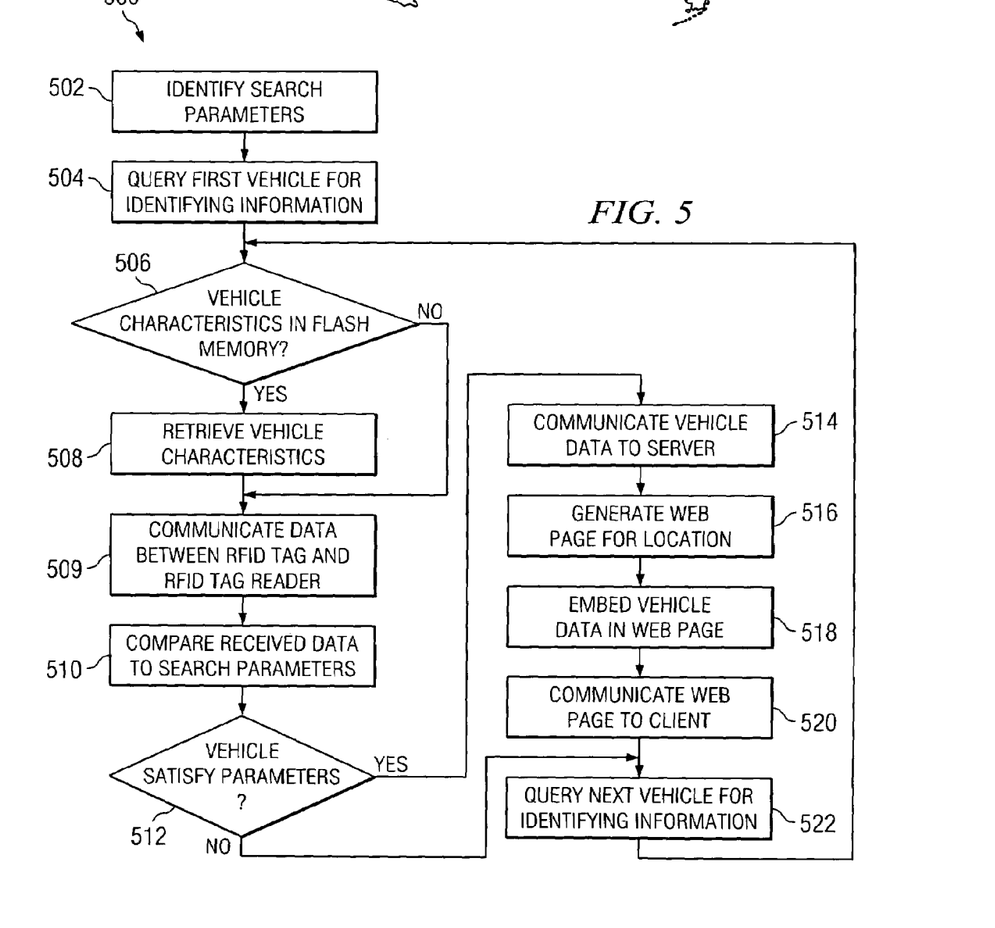
FIG. 5 is a flowchart illustrating an example method for managing RFID tagged vehicles in accordance with one embodiment of the present invention.

FIG. 5 is a flowchart illustrating an example method 500 for managing RFID tagged vehicles 120. Generally, method 500 describes RFID tag reader 104 collecting various electronic vehicle information and communicating it server 202 and server 202 processing the RFID data as appropriate and presenting the information to a client 204 over network 208 through an example website (216). Method 500 is described in respect to system 200 and, in particular, to a dealership including server 202. However, any other suitable system or portion of a system may use appropriate embodiments of method 500 to retrieve and process RFID information to manage a plurality of RFID tagged vehicles 120 without departing from the scope of this disclosure.

Example method 500 begins at step 502, where certain optional search parameters are identified. For example, a dealer using client 204 may communicate one or more search parameters to server 202 for processing. Server 202 may then communicate these parameters to RFID tag reader 104 for filtering of various queries of RFID tags 102. Next, at step 504, RFID tag reader 104 queries a first vehicle 120 for identifying information 145. Then, at decisional step 506, RFID tag 102 may determine if vehicle characteristics 150 are available in flash memory 106. If they are, then RFID tag 102 retrieves the dynamic vehicle characteristics 150 at step 508. Next, at step 509, this data, comprising identifying information 145 and/or vehicle characteristics 150, are communicated from RFID tag 102 to RFID tag reader 104. RFID tag reader 104 compares the received data to the identified search parameters at step 510. If the received data satisfies search parameters at decisional step 512, then RFID tag reader 104 communicates the vehicle data to server 202 at step 514. In certain embodiments, server 202 generates a web page mapping the dealership and indicating the location of the particular vehicle 120 at step 516. This location may be a GPS location, a lot number, a lane and spot identifier, or any other suitable identifier of a particular place. The received vehicle data may then be embedded in the generated web page at step 518. For example, as described in regard to FIG. 4, as a dealer moves the mouse over the particular vehicle, certain vehicle characteristics and information are operable to be presented to the dealer. Next, at step 520, this generated web page may then be communicated to client 204. Next, RFID tag reader 104 queries a next vehicle 120 for identifying information 145 at step 522 and processing returns to decisional step 506.

The preceding flowchart focuses on the operation of example systems 100 and/or 200 described in FIGS. 1 and 2 as these example diagrams illustrate various functional elements that implement some or all of the preceding techniques for managing tagged vehicles 120. However, as noted above, systems 100 and/or 200 contemplate using any suitable combination and arrangement of functional elements for providing these operations, and these techniques can be combined with other techniques as appropriate. Further, various changes may be made to the preceding flowcharts without departing from the scope of this disclosure. In other words, many of the steps in these flowcharts may take place simultaneously and/or in different orders than as shown. Moreover, these systems may implement methods with additional steps, fewer steps, and/or different steps, so long as the methods remain appropriate. For example, the web page may be generated prior to the collection of the RFID data and then updated as the data is retrieved, as well as any other appropriate customization or implementation within the scope of this invention.

Although techniques have been described in terms of certain embodiments and generally associated methods, alterations and permutations of these embodiments and methods will be apparent to those skilled in the art. Accordingly, the above description of example embodiments does not define or constrain this invention. Other changes, substitutions, and alterations are also possible without departing from the spirit and scope of this invention.

What is claimed is:

1. A Radio Frequency Identification (RFID) tag for managing a vehicle, the RFID tag coupled with the vehicle through an onboard computer, communicably coupled with a flash memory, and operable to:
    store identifying information associated with the vehicle, the identifying information comprising static data describing the vehicle;
    automatically communicate the identifying information to an RFID tag reader via a wireless communication;
    automatically communicate electronic representations of varying vehicle characteristics, stored in the flash memory, to the RFID tag reader via the wireless communication;
    customize at least one of the varying vehicle characteristics through a radio control console in the vehicle; and
    activate a vehicle security feature upon detection of being decoupled from the vehicle.

2. The RFID tag of claim 1, the identifying information comprising one or more of the following:
    a vehicle identification number of the vehicle;
    an identifier associated with a plant that at least partially manufactured the vehicle;
    a make of the vehicle;
    a model of the vehicle; and
    an engine type of the vehicle.

3. The RFID tag of claim 1, the varying vehicle characteristics comprising one or more of the following:
    maintenance information of the vehicle;
    ownership data of the vehicle;
    mileage of the vehicle;
    date of purchase;
    information of the dealership associated with the vehicle;
    warranty information;
    asking price of the vehicle;
    invoice price of the vehicle;
    owner manual; and
    diagnostic system information.

4. The RFID tag of claim 3, the varying vehicle characteristics further comprising:
    a current setting;
    an oil life monitor reset;
    a tire inflation monitor reset;
    a delayed headlamp illumination;
    an automatic door lock and unlock;
    a remote visual/audible verification of remote lock/unlock;
    an enable/disable content theft;
    an enable/disable trunk lock shock sensor;
    a short or long horn with remote lock/unlock; and
    a key fob transmitter programming.

5. The RFID tag of claim 1, wherein the wireless communication is encoded.

6. The RFID tag of claim 1, the vehicle security feature comprising one of the following:
    disabling the vehicle engine; and
    disabling the vehicle onboard computer.

7. The RFID tag of claim 1, the radio control console coupled to the vehicle using a serial data link.

8. A method for managing vehicles using Radio Frequency Identification (RFID) comprising:
    querying a first RFID tag, coupled with a first vehicle through a first onboard computer and communicably coupled with a flash memory, for identifying information of the first vehicle and for varying vehicle characteristics of the first vehicle stored in the flash memory, the first RFID tag operable to activate a vehicle security feature upon detection of the removal of the first RFID tag from the first vehicle;
    querying a second RFID tag coupled with a second vehicle through a second onboard computer for identifying information of the second vehicle;
    customizing at least one of the varying vehicle characteristics of the first vehicle through a radio control console in the first vehicle; and
    automatically communicating the first identifying information, the first varying vehicle characteristics, and the second identifying information to a user.

9. The method of claim 8, the first identifying information comprising one or more of the following:
    a vehicle identification number of the vehicle;
    an identifier associated with a plant that at least partially manufactured the vehicle;
    a make of the vehicle;
    a model of the vehicle; and
    an engine type of the vehicle.

10. The method of claim 8, further comprising:
    dynamically identifying at least one parameter for filtering the vehicles; and
    automatically comparing the first varying vehicle characteristics to the one or more identified parameters.

11. The method of claim 10, further comprising communicating a Vehicle Identification Number (VIN) to the user based on the comparison.

12. The method of claim 10, further comprising identifying the first vehicle as a vehicle in need of maintenance based on the comparison.

13. The method of claim 8, the varying vehicle characteristics comprising one or more of the following:
    maintenance information of the vehicle;
    ownership data of the vehicle;
    mileage of the vehicle;
    date of purchase;
    information of the dealership associated with the vehicle;
    warranty information;
    asking price of the vehicle;
    invoice price of the vehicle;
    owner manual; and
    diagnostic system information.

14. The method of claim 8, wherein the query of the first RFID tag comprises a first query of the first RFID tag at a factory and the method further comprising querying the first RFID tag at a storage location.

15. The method of claim 14, further comprising querying the first RFID tag at a shipping point.

16. The method of claim 8, wherein communicating the first identifying information, the first varying vehicle characteristics, and the second identifying information to the user comprises:
- identifying a first location of the first vehicle;
- identifying a second location of the second vehicle;
- generating a graphical representation of a vehicle lot associated with the first and second vehicles, the graphical representation identifying the identified first location and the identified second location;
- embedding the first identifying information into the graphical representation of the identified first location for presentation to the user; and
- embedding the first varying vehicle characteristics into the graphical representation of the identified first location for presentation to the user.

17. The method of claim 8, wherein querying the first and second RFID tags occurs through an encoded communication.

18. A Radio Frequency Identification (RFID) vehicle management system comprising:
- a first RFID tag coupled with a first vehicle through a first onboard computer and communicably coupled with a first flash memory, operable to activate a vehicle security feature upon detection of being decoupled from the first vehicle and customize at least one varying vehicle characteristic through a radio control console in the first vehicle;
- a second RFID tag coupled with a second vehicle through a second onboard computer; and
- a first RFID tag reader operable to:
    - query the first RFID tag for identifying information of the first vehicle;
    - query the first RFID tag for varying vehicle characteristics of the first vehicle; and
    - dynamically communicate the identifying information and the varying vehicle characteristics to a user.

19. The RFID vehicle management system of claim 18, the identifying information comprising one or more of the following:
- a vehicle identification number of the coupled vehicle;
- an identifier associated with a plant that at least partially manufactured the coupled vehicle;
- a make of the coupled vehicle;
- a model of the coupled vehicle; and
- an engine type of the coupled vehicle.

20. The RFID vehicle management system of claim 18, the first RFID tag reader located at a manufacturing plant.

21. The RFID vehicle management system of claim 18, the first RFID tag reader located at a dealership.

22. The RFID vehicle management system of claim 18, further comprising a workstation, the workstation operable to:
- identify a first location of the first vehicle;
- identify a second location of the second vehicle;
- generate a graphical representation of a vehicle lot associated with the first and second vehicles, the graphical representation identifying the identified first location and the identified second location; and
- embed the first identifying information into the graphical representation of the identified first location for presentation to the user.

* * * * *